(12) United States Patent
Yamagata (10) Patent No.: US 8,731,761 B2
(45) Date of Patent: May 20, 2014

(54) VEHICLE, CONTROL METHOD, AND COMPUTER PROGRAM

(75) Inventor: Keita Yamagata, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 13/819,440

(22) PCT Filed: Oct. 20, 2011

(86) PCT No.: PCT/JP2011/074190
§ 371 (c)(1),
(2), (4) Date: Feb. 27, 2013

(87) PCT Pub. No.: WO2012/053608
PCT Pub. Date: Apr. 26, 2012

(65) Prior Publication Data
US 2013/0166129 A1    Jun. 27, 2013

(30) Foreign Application Priority Data
Oct. 22, 2010   (JP) .................................. 2010-237800

(51) Int. Cl.
*B60L 9/00*  (2006.01)
*B60L 11/00* (2006.01)
*G05D 1/00*  (2006.01)
*G05D 3/00*  (2006.01)
*G06F 7/00*  (2006.01)
*G06F 19/00* (2011.01)

(52) U.S. Cl.
USPC ........................................ 701/22; 180/65.21

(58) Field of Classification Search
USPC ........................................ 701/22; 180/65.21
See application file for complete search history.

(56) References Cited

U.S. PATENT DOCUMENTS

2002/0170758 A1* 11/2002 Shimabukuro et al. ...... 180/65.2
2008/0006457 A1*  1/2008 Fujimoto et al. ............. 180/65.1
2008/0076623 A1*  3/2008 Tabata et al. ..................... 477/5

FOREIGN PATENT DOCUMENTS

| JP | 2003-041966 A | 2/2003 |
| JP | 2007-055493 A | 3/2007 |
| JP | 2007-331646 A | 12/2007 |

* cited by examiner

*Primary Examiner* — Imran Mustafa
(74) *Attorney, Agent, or Firm* — Cowan, Liebowitz & Latman, P.C.; Mark Montague (57) ABSTRACT

Provided are a vehicle, control method, and computer program with which reliable starting is possible without modifying hardware. When a clutch is disconnected, an inverter determines whether the time period in which the absolute value of the rotational speed of a motor becomes a predetermined first threshold or less and the torque of the motor becomes a predetermined second threshold or greater has continuously equaled or exceeded a predetermined third threshold. When the clutch is disconnected and it is determined that the time period in which the absolute value of the rotational speed of the motor becomes the predetermined first threshold or less and the torque of the motor becomes the predetermined second threshold or greater has continuously equaled or exceeded the predetermined third threshold, an HV-ECU controls the motor to restrict the torque of the motor and also controls the clutch to connect the clutch.

4 Claims, 4 Drawing Sheets

VEHICLE, CONTROL METHOD, AND COMPUTER PROGRAM

CROSS REFERENCE TO RELATED APPLICATIONS

This is a U.S. national stage of application No. PCT/JP2011/074190, filed on Oct. 20, 2011. Priority under 35 U.S.C.§119(a) and 35 U.S.C.§365(b) is claimed from Japanese Patent Application No. 2010-237800, filed on Oct. 22, 2010, the disclosure of which are also incorporated herein by reference.

TECHNICAL FIELD

The present invention relates to a vehicle, a control method, and a computer program.

BACKGROUND ART

A so-called hybrid vehicle that is driven by an internal combustion engine and an electric motor receives attention. When the hybrid vehicle decelerates, the electric motor functions as an electric generator in order to perform an electric power regeneration (hereinafter, also simply referred to as a regeneration) and store the electric power. The stored electric power is used for generating driving force, for example, when the vehicle accelerates or runs.

Some hybrid vehicles have a gear box configured to automatically shift gears. Hereinafter, the gear box is also referred to as a transmission.

In such cases, a clutch that connects the power or cuts the connection of the power can be provided between the internal combustion engine and the electric motor.

Some conventional vehicles include an internal combustion engine, an electric machine capable of operating as an electric motor and as an electric generator, a clutch, a gear box of which transfer ratio is variable, a power electronics, and an electric energy storage device. The clutch is provided between the internal combustion engine and the gear box. The driving torque can be led through the clutch from the internal combustion engine to the gear box and from the electric machine to the internal combustion engine. The electric machine is provided between the only clutch placed between the internal combustion engine and the gear box, and the gear box so that the electric machine can directly transfer positive torque or negative torque to the gear box input shaft of the gear box (for example, see patent literature PTL1).

CITATION LIST

Patent Literature

PTL1: JP 2007-118943 A

SUMMARY OF INVENTION

Technical Problem

However, when the hybrid vehicle starts moving only by the electric motor and then the electric motor stops although generating torque, for example, when the vehicle surmounts a steep upgrade or an obstacle, the vehicle sometimes cannot start moving because the current is concentrated in the element of an inverter that drives the electric motor and heat is generated.

In order to solve the problem, enhancing the heat-resistance or cooling performance of the element can be considered. However, it is concerned that this increases the cost.

In light of the foregoing, an objective of the present invention is to solve the problem or, in other words, to provide a vehicle, a control method, and a computer program that enable the vehicle to certainly start moving without changing the hardware.

Solution to Problem

To solve the above-mentioned problem, an aspect of the present invention is directed to a vehicle driven by an internal combustion engine and an electric motor that are connected to shafts configured to transfer power through a clutch configured to connect the power or disconnect the connection of the power, the vehicle includes an apparatus comprising: determination means for determining, while the clutch is disengaged, whether a condition, where an absolute value of a rotational speed of the electric motor is equal to or less than a predetermined first threshold and where torque of the electric motor is equal to or more than a predetermined second threshold, lasts for a predetermined third threshold or more; and control means for controlling the electric motor to limit the torque of the electric motor and controlling the clutch to be engaged when it is determined, while the clutch is disengaged, that the condition where the absolute value of the rotational speed of the electric motor is equal to or less than the first threshold and where the torque of the electric motor is equal to or more than the second threshold lasts for the third threshold or more.

In addition, in the vehicle according to the aspect of the present invention, the control means may control the electric motor to cause the torque of the electric motor to be equal to or less than a predetermined fourth threshold within a predetermined period.

In addition, in the vehicle according to the aspect of the present invention, the control means may control the electric motor to cancel the limitation of the torque of the electric motor after a predetermined period elapses after the torque of the electric motor is limited.

According to another aspect of the present invention, a control method for controlling a vehicle driven by an internal combustion engine and an electric motor that are connected to shafts configured to transfer power through a clutch configured to connect the power or disconnect the connection of the power includes the steps of: determining, while the clutch is disengaged, whether a condition, where an absolute value of a rotational speed of the electric motor is equal to or less than a predetermined first threshold and where torque of the electric motor is equal to or more than a predetermined second threshold, lasts for a predetermined third threshold or more; and controlling the electric motor to limit the torque of the electric motor and controlling the clutch to be engaged when it is determined, while the clutch is disengaged, the condition where the absolute value of the rotational speed of the electric motor is equal to or less than the first threshold and where the torque of the electric motor is equal to or more than the second threshold lasts for the third threshold or more.

According to still another aspect of the present invention, a computer program causes a computer for controlling a vehicle driven by an internal combustion engine and an electric motor that are connected to shafts configured to transfer power through a clutch configured to connect the power or disconnect the connection of the power to perform a process including the steps of: determining, while the clutch is disengaged, whether a condition, where an absolute value of a rotational speed of the electric motor is equal to or less than a predetermined first threshold and where torque of the electric motor is equal to or more than a predetermined second threshold, lasts for a predetermined third threshold or more; and controlling the electric motor to limit the torque of the electric motor and controlling the clutch to be engaged when it is determined, while the clutch is disengaged, that the condition where the absolute value of the rotational speed of the electric motor is equal to or less than the first threshold and the time when the torque of the electric motor is equal to or more than the second threshold lasts for the third threshold or more.

Advantageous Effects of Invention

According to an aspect of the present invention, a vehicle, a control method, and a computer program that enable the vehicle to certainly start moving without changing the hardware can be provided.

DESCRIPTION OF EMBODIMENTS

Figure 1:
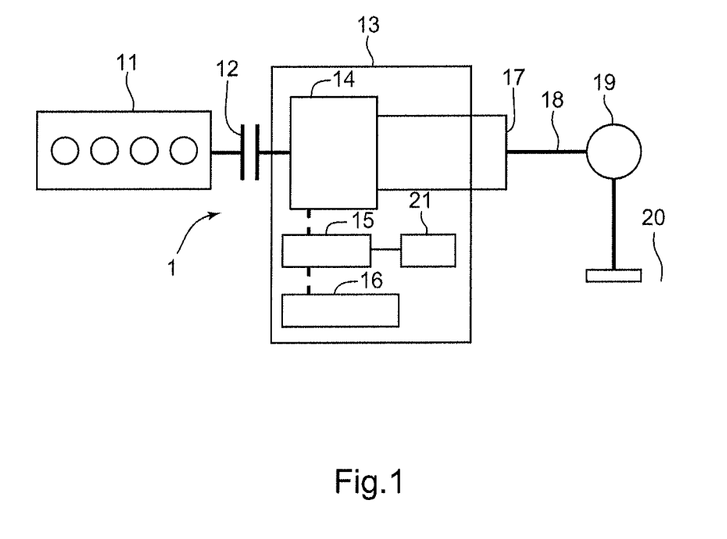
FIG. 1 is a block diagram for illustrating an exemplary structure of a hybrid vehicle 1.

Hereinafter, a hybrid vehicle according to an embodiment of the present invention will be described with reference to FIGS. 1 to 4.
FIG. 1 is a block diagram for illustrating an exemplary structure of a hybrid vehicle 1. The hybrid vehicle 1 is an example of a vehicle. The hybrid vehicle 1 is driven by an internal combustion engine and/or an electric motor through a gear box configured to automatically shift gears. For example, when the vehicle decelerates, the electric power can be regenerated by the electric motor. The gear box configured to automatically shift gears is, for example, referred to as an automated mechanical/manual transmission. The transmission can automatically shift the gears while having the same structure as a manual transmission.

The hybrid vehicle 1 includes an internal combustion engine 11, a clutch 12, a hybrid device 13, an electric motor 14, an inverter 15, a Hybrid Vehicle (HV) battery 16, a gear box 17, an output shaft 18, a differential gear 19, a wheel 20, and an HV-Electronic Control Unit (ECU) 21. Note that the hybrid device 13 includes the electric motor 14, the inverter 15, the HV battery 16, and the HV-ECU 21. Note that the gear box 17 includes the above-mentioned automated mechanical/manual transmission and is operated by a shift unit (not shown in the drawings) including a drive range (hereinafter, referred to as a D (Drive) range).

The internal combustion engine 11 internally combusts gasoline, light oil, Compressed Natural Gas (CNG), Liquefied Petroleum Gas (LPG), alternative fuel, or the like in order to generate power for rotating a shaft and transfer the generated power to the clutch 12.

The clutch 12 transfers the shaft output from the internal combustion engine 11 to the wheel 20 through the electric motor 14, the gear box 17, the output shaft 18, and the differential gear 19. In other words, the clutch 12 mechanically connects (hereinafter, simply referred to as connects) the rotating shaft of the internal combustion engine 11 to the rotating shaft of the electric motor 14 by the control of the HV-ECU 21 in order to transfer the shaft output of the internal combustion engine 11 to the electric motor 14. On the other hand, the clutch 12 cuts (hereinafter, simply referred to as cuts or disconnects) the mechanical connection between the rotating shaft of the internal combustion engine 11 and the rotating shaft of the electric motor 14 so that the rotating shaft of the internal combustion engine 11 and the rotating shaft of the electric motor 14 can rotate at different rotational speeds from each other.

For example, the clutch 12 mechanically connects the rotating shaft of the internal combustion engine 11 to the rotating shaft of the electric motor 14, for example, when the hybrid vehicle 1 runs by the power of the internal combustion engine 11 and this causes the electric motor 14 to generate electric power, when the driving force of the electric motor 14 assists the internal combustion engine 11, and when the electric motor 14 starts the internal combustion engine 11.

Alternatively, for example, the clutch 12 cuts the mechanical connection between the rotating shaft of the internal combustion engine 11 and the rotating shaft of the electric motor 14 when the internal combustion engine 11 stops or is in an idling state and the hybrid vehicle 1 runs by the driving force of the electric motor 14, and when the hybrid vehicle 1 decelerates or runs on the down grade and the electric motor 14 generates electric power (regenerates electric power) while the internal combustion engine 11 stops or is in an idling state.

Note that the clutch 12 differs from the clutch operated by the driver's operation of a clutch pedal, and is operated by the control of the HV-ECU 21.

The electric motor 14 is a so-called motor generator that supplies a shaft output to the gear box 17 by generating the power for rotating the shaft using the electric power supplied from the inverter 15, or that supplies electric power to the inverter 15 by generating the electric power using the power for rotating the shaft supplied from the gear box 17. For example, when the hybrid vehicle 1 accelerates or runs at a constant speed, the electric motor 14 generates the power for rotating the shaft to supply the shaft output to the gear box 17 in order to cause the hybrid vehicle 1 to run in cooperation with the internal combustion engine 11. Further, the electric motor 14 works as an electric generator, for example, when the electric motor 14 is driven by the internal combustion engine 11, or when the hybrid vehicle 1 runs without power, for example, the hybrid vehicle 1 decelerates or runs on the down grade. In that case, electric power is generated by the power for rotating the shaft supplied from the gear box 17 and is supplied to the inverter 15 in order to charge the HV battery 16.

The inverter 15 is controlled by the HV-ECU 21, and converts the direct voltage from the HV battery 16 into an alternating voltage or converts the alternating voltage from the electric motor 14 into a direct voltage. When the electric motor 14 generates power, the inverter 15 converts the direct voltage of the HV battery 16 into an alternating voltage and supplies the electric power to the electric motor 14. When the electric motor 14 generates electric power, the inverter 15 converts the alternating voltage from the electric motor 14 into a direct voltage. In other words, in that case, the inverter 15 works as a rectifier and a voltage regulator for supplying a direct voltage to the HV battery 16.

Further, the inverter 15 determines, for example, whether a condition, where the absolute value of the rotational speed of the electric motor 14 is equal to or less than a predetermined rotational speed A and where the torque of the electric motor 14 is equal to or more than a predetermined torque B, lasts for a predetermined period C or more. When it is determined that the condition where the absolute value of the rotational speed of the electric motor 14 is equal to or less than the predetermined rotational speed A and the torque of the electric motor 14 is equal to or more than the predetermined torque B lasts for the predetermined period C or more, the inverter 15 transmits a current concentration determination flag to the HV-ECU 21.

The HV battery 16 is a secondary cell capable of being charged and discharged. The HV battery 16 supplies electric power to the electric motor 14 through the inverter 15 when the electric motor 14 generates power. Alternatively, the HV battery 16 is charged with the electric power generated by the electric motor 14 when the electric motor 14 generates electric power.

The gear box 17 includes an automated mechanical/manual transmission (not shown in the drawings) that selects one of a plurality of gear ratios (change gear ratios) according to the instruction signal to shift gears from the HV-ECU 21 in order to shift the change gear ratios and transfer the gear-shifted power of the internal combustion engine 11 and/or of the electric motor 14 to the wheel 20 through the output shaft 18 and the differential gear 19. Alternatively, the gear box 17 transfers the power from the wheel 20 through the output shaft 18 and the differential gear 19 to the electric motor 14, for example, when the vehicle decelerates or runs on the down grade. Note that the automated mechanical/manual transmission can also shift the gear position to a given gear number by the driver's hand operation of the shift unit.

The output shaft 18 is a so-called propeller shaft or drive shaft. The output shaft 18 transfers the power output from the gear box 17 to the differential gear 19. The differential gear 19 transfers the power to the right and left wheels 20 and absorbs the difference between the rotations of the right and left wheels 20.

The HV-ECU 21 is an example of a computer, and controls the electric motor 14 by controlling the inverter 15. When receiving the current concentration determination flag transmitted from the inverter 15, the HV-ECU 21 determines that the condition where the absolute value of the rotational speed of the electric motor 14 is equal to or less than the predetermined rotational speed A and the torque of the electric motor 14 is equal to or more than the predetermined torque B lasts for the predetermined period C or more.

For example, the HV-ECU 21 includes a Central Processing Unit (CPU), an Application Specific Integrated Circuit (ASIC), a microprocessor (micro-computer), a Digital Signal Processor (DSP), and the like, and internally has an operation unit, a memory, an Input/Output (I/O) port, and the like.

Note that a computer program to be executed by the HV-ECU 21 can be installed on the HV-ECU 21 that is a computer in advance by being stored in a non-volatile memory inside the HV-ECU 21 in advance.

The wheel 20 is a drive wheel for transferring the driving force to the road surface. Note that, although only a wheel 20 is illustrated in FIG. 1, the hybrid vehicle 1 actually includes a plurality of the wheels 20.

Figure 2:
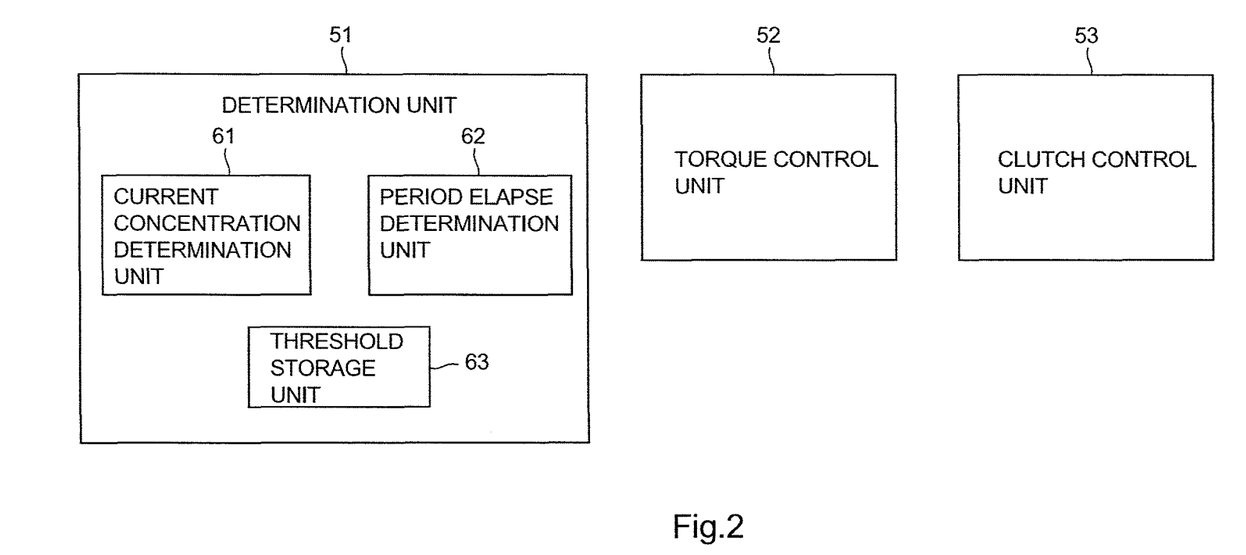
FIG. 2 is a block diagram for illustrating an exemplary configuration of a function implemented in an HV-ECU 21.

FIG. 2 is a block diagram for illustrating an exemplary configuration of a function implemented in the HV-ECU 21 executing a predetermined computer program. In other words, when the HV-ECU 21 executes the computer program, a determination unit 51, a torque control unit 52, and a clutch control unit 53 are implemented.

The determination unit 51 determines whether a condition, where the absolute value of the rotational speed of the electric motor 14 is equal to or less than the predetermined rotational speed A and where the torque of the electric motor 14 is equal to or more than the predetermined torque B, lasts for the predetermined period C or more, and determines whether a predetermined period F has elapsed after the torque of the electric motor 14 has been limited. The determination unit 51 includes a current concentration determination unit 61, a period elapse determination unit 62, and a threshold storage unit 63.

According to whether the current concentration determination unit 61 has received a current concentration determination flag transmitted from the inverter 15, the current concentration determination unit 61 determines whether the condition where the absolute value of the rotational speed of the electric motor 14 is equal to or less than the predetermined rotational speed A and the torque of the electric motor 14 is equal to or more than the predetermined torque B lasts for the predetermined period C or more. Note that, in order to determine whether the condition where the absolute value of the rotational speed of the electric motor 14 is equal to or less than the predetermined rotational speed A and the torque of the electric motor 14 is equal to or more than the predetermined torque B lasts for the predetermined period C or more, the current concentration determination unit 61 can also obtain, in real time, the data indicating the rotational speed and the torque of the electric motor 14 from the inverter 15, and read a threshold A indicating the rotational speed A, a threshold B indicating the torque B, and a threshold C indicating the period C from the threshold storage unit 63 that stores the thresholds in advance. In that case, the current concentration determination unit 61 can internally maintain the thresholds A, B, and C, for example, as constant numbers.

The period elapse determination unit 62 reads a threshold F indicating the period F from the threshold storage unit 63 that stores the threshold in advance, and compares the elapsed time shown by a real time clock housed in the HV-ECU 21 with the threshold F in order to determine whether the predetermined period F has elapsed after the torque of the electric motor 14 has been limited.

The threshold storage unit 63 stores the predetermined thresholds A, B, C, and F.

Note that the period elapse determination unit 62 can internally maintain the threshold F, for example, as a constant number.

The torque control unit 52 controls the electric motor 14 to increase and decrease the torque generated by the electric motor 14 by controlling the inverter 15.

The clutch control unit 53 controls the clutch 12 to be engaged, be in a so-called half-engaged clutch state, or be disengaged by transmitting a control signal.

Figure 3A:
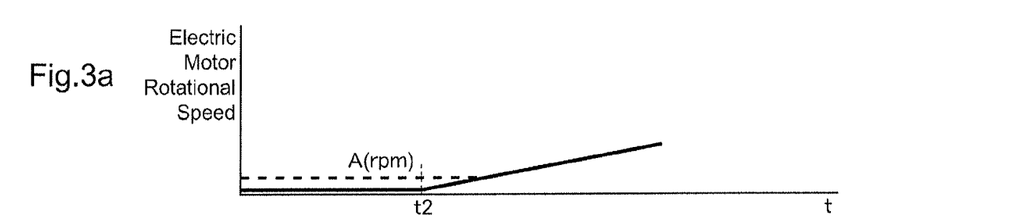
FIGS. 3A to 3C are time charts for describing a process for limiting the torque of an electric motor 14.
Figure 3B:
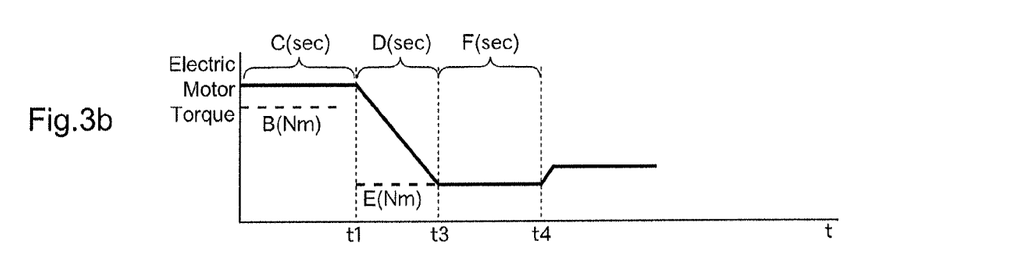
Figure 3C:
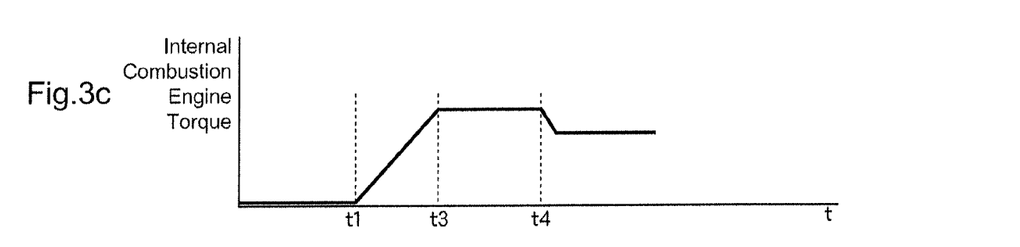

FIGS. 3A to 3C are time charts for describing a process for limiting the torque of the electric motor 14. The horizontal axes in FIGS. 3A to 3C show a time. FIG. 3A is a time chart in which the rotational speed of the electric motor 14 corresponding to the time shown as the horizontal axis is shown as the vertical axis. FIG. 3B is a time chart in which the torque of the electric motor 14 corresponding to the time shown as the horizontal axis is shown as the vertical axis. FIG. 3C is a time chart in which the torque of the internal combustion engine 11 corresponding to the time shown as the horizontal axis is shown as the vertical axis.

As illustrated in FIGS. 3A and 3B, when the condition, where the absolute value of the rotational speed (r.p.m.) of the electric motor 14 is equal to or less than the predetermined rotational speed A and where the torque (Nm) of the electric motor 14 is equal to or more than the predetermined torque B, lasts for the predetermined period C (sec) or more before a time t1, it is determined that the current is concentrated in the inverter 15 and the inverter 15 transmits, to the HV-ECU 21, the current concentration determination flag indicating that the current is concentrated.

Note that the internal combustion engine 11 stops or is in the idling state, the hybrid vehicle 1 runs by the driving force of the electric motor 14, and the clutch 12 is disengaged at the period C.

When the current concentration determination flag has been transmitted to the HV-ECU 21, the torque control unit 52 controls the inverter 15 by transmitting a command to the inverter 15 in order to limit the torque of the electric motor 14 and then linearly narrow the torque of the electric motor 14 to a predetermined torque E during a period D (sec) from the time t1 to a time t3. In other words, the torque of the electric motor 14 is limited to the torque E. In that case, at the timing when a predetermined time has elapsed from the time t1, the clutch 12 gets in the so-called half-engaged clutch state in which the torque of the internal combustion engine 11 is partially transmitted to the electric motor 14, and the clutch 12 is engaged at the timing when the rotational speed of the electric motor 14 and the rotational speed of the internal combustion engine 11 synchronize with each other.

Accordingly, as illustrated in FIG. 3A, the rotational speed of the electric motor 14 increases from a time t2. Further, as illustrated in FIG. 3C, the torque of the internal combustion engine 11 rises during the period D (sec) from the time t1 to the time t3.

The torque of the electric motor 14 that has been limited to the torque E is added to the torque of the internal combustion engine 11 after the time t3. This causes the vehicle to start moving with assistance. When the vehicle starts moving with assistance, the electric motor 14 assists the internal combustion engine 11.

The limitation of the torque of the electric motor 14 is cancelled at the time t4 when the period F (sec) has elapsed from the time t3 when the torque of the electric motor 14 has been limited to the torque E. At the time t4, the electric motor 14 can generate torque exceeding the torque E.

Figure 4:
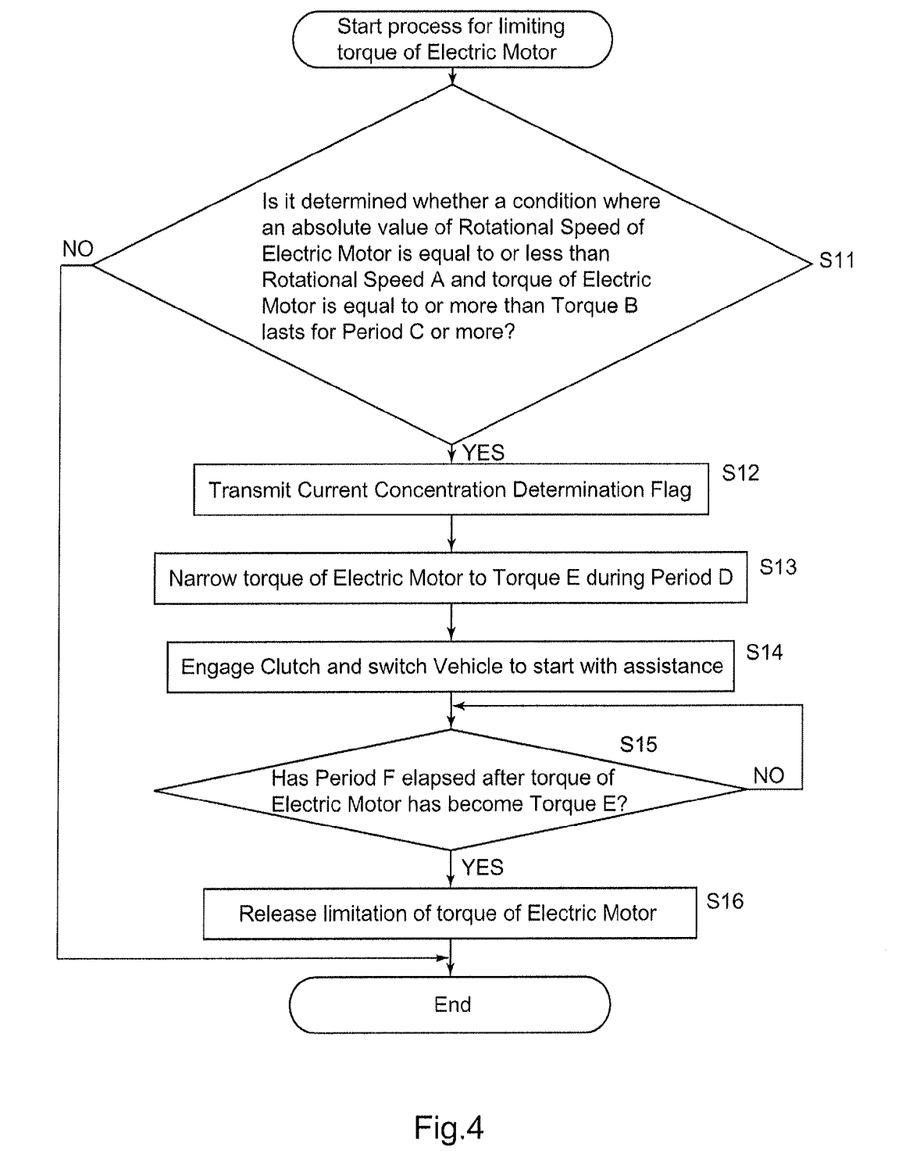
FIG. 4 is a flowchart for describing a process for limiting the torque of the electric motor 14.

Next, the process for limiting the torque of the electric motor 14 will be described with reference to the flowchart in FIG. 4. In step S11, the inverter 15 determines whether the condition, where the absolute value of the rotational speed of the electric motor 14 is equal to or less than the predetermined rotational speed A and where the torque of the electric motor 14 is equal to or more than the predetermined torque B, lasts for the predetermined period C or more.

When it is determined in step S11 that the condition where the absolute value of the rotational speed of the electric motor 14 is equal to or less than the predetermined rotational speed A and the torque of the electric motor 14 is equal to or more than the predetermined torque B lasts for the predetermined period C or more, the process goes to step S12 and the inverter 15 transmits the current concentration determination flag to the HV-ECU 21.

In step S13, when receiving the current concentration determination flag, the current concentration determination unit 61 in the determination unit 51 determines that the condition where the absolute value of the rotational speed of the electric motor 14 is equal to or less than the predetermined rotational speed A and the time when the torque of the electric motor 14 is equal to or more than the predetermined torque B lasts for the predetermined period C or more. Then, the torque control unit 52 controls the inverter 15 by transmitting a command to the inverter 15 in order to limit the torque of the electric motor 14 and then narrow the torque of the electric motor 14 to the predetermined torque E during the period D after the current concentration determination flag has been received.

In step S14, the clutch control unit 53 engages the clutch 12 by transmitting a control signal in order to switch the start of the vehicle to the start with assistance using the power of the internal combustion engine 11 and the power of the electric motor 14. In more detail, during the period D after the current concentration determination flag has been received, the clutch control unit 53 controls the clutch 12 to get in the so-called half-engaged clutch state in order to partially transmit the torque of the internal combustion engine 11 to the electric motor 14. After the period D has elapsed, the clutch control unit 53 controls the clutch 12 to get in a so-called engaged state in order to transmit all of the torque of the internal combustion engine 11 to the electric motor 14.

In step S15, the period elapse determination unit 62 in the determination unit 51 reads the threshold F indicating the period F from the threshold storage unit 63 that stores the threshold in advance, and compares the elapsed time with the threshold F in order to determine whether the predetermined period F has elapsed after the torque of the electric motor 14 has been limited (after the torque of the electric motor 14 has become the torque E). When it is determined that the period F has not elapsed, the process goes back to step S15 and the process of the determination is repeated until the period F has elapsed.

When it is determined in step S15 that the period F has elapsed, the process goes to step S16. Then, the torque control unit 52 cancels the limitation of the torque of the electric motor 14 and the process for limiting the torque of the electric motor is completed.

When it is determined in step S11 that the condition where the absolute value of the rotational speed of the electric motor 14 is equal to or less than the predetermined rotational speed A and the time when the torque of the electric motor 14 is equal to or more than the predetermined torque B does not last for the predetermined period C or more, the process for limiting the torque of the electric motor is completed without limiting the torque of the electric motor 14 because it is not necessary to limit the torque of the electric motor 14.

Note that, in step S11, the current concentration determination unit 61 can also obtain, in real time, the data indicating the rotational speed and the torque of the electric motor 14 from the inverter 15, and read the threshold A indicating the rotational speed A, the threshold B indicating the torque B, and the threshold C indicating the period C from the threshold storage unit 63 in order to determine whether the condition where the absolute value of the rotational speed of the electric motor 14 is equal to or less than the predetermined rotational speed A and the time when the torque of the electric motor 14 is equal to or more than the predetermined torque B lasts for the predetermined period C or more.

As described above, when the current is concentrated in the inverter 15, the torque of the electric motor 14 is limited and the start of the vehicle is switched to the start with assistance. Thus, the inverter 15 is prevented from excessively generating heat. Accordingly, even when the hybrid vehicle 1 stops, for example, when the vehicle 1 surmounts a steep upgrade or an obstacle, constant torque can continuously be generated so that the vehicle 1 can certainly start moving.

Further, it is not necessary to enhance the heat-resistance or cooling performance of the element and it is not necessary to change the hardware.

As described above, the vehicle can certainly start moving without changing the hardware.

Further, while the computer program executed by the HV-ECU 21 is installed on the HV-ECU 21 in advance in the description above, the computer program can be installed on the HV-ECU 21 as a computer by attaching removable media recording the computer program (storing the computer program), for example, to a drive (not shown in the drawings) and storing the computer program read from the removable media in a non-volatile memory inside the HV-ECU 21, or receiving, by a communication unit (not shown in the drawings), a computer program transmitted through a wired or wireless transmission medium and storing the computer program in a non-volatile memory inside the HV-ECU 21.

Note that the computer program executed by the computer can be for performing the process in chronological order according to the order described herein or can be for performing the process in parallel or at the necessary timing, for example, when the computer program is invoked.

Further, the embodiments of the present invention are not limited to the above-mentioned embodiment, and can be variously modified without departing from the gist of the invention.

Although the threshold F is fixedly set in the above-mentioned embodiment, the threshold F can variably be set. For example, the A is set as the threshold of the rotational speed of the electric motor. However, a threshold A1 lower than the A is provided. When the rotational speed of the electric motor is equal to or less than the threshold A1 and the process reaches step S14, the period F can be controlled to be extended. The B is set as the threshold of the torque of the electric motor. However, a threshold B1 higher than the B is provided. When the torque of the electric motor is equal to or more than the threshold B1 and the process reaches step S14, the period F can be controlled to be extended. In such cases, one of the thresholds A1 and B1 can be adopted, or both of the thresholds A1 and B1 can be adopted. In other words, for example, (1) when the rotational speed of the electric motor is equal to or less than the threshold A1, the period F is extended. (2) when the torque of the electric motor is equal to or more than the threshold B1, the period F is extended. (3) when the rotational speed of the electric motor is equal to or less than the threshold A1 and the torque the electric motor is equal to or more than the threshold B1, the period F is extended. Alternatively, the period F can be extended even longer in the case (3) than in the cases (1) and (2).

As another method to variably set the threshold F, the inclination of the road surface on which the hybrid vehicle 1 runs can be taken into consideration. For example, even though the limitation of the torque of the electric motor 13 has been cancelled, the torque is possibly limited again soon when the hybrid vehicle 1 runs on a steep upgrade. In light of the foregoing, a threshold is provided for the angle of the upgrade surface during the period F so that the period F is controlled to be extended when the angle of the upgrade exceeds the threshold. In that case, the period F is preferably extended until the angle of the upgrade is equal to or less than the threshold.

Further, when the weight of the load on the hybrid vehicle 1 is large even though the angle of the upgrade is equal to or less than the threshold, the torque of the electric motor 13 is possibly limited again soon even once the limitation of the torque has been released. In light of the foregoing, the threshold of the angle of the upgrade surface during the period F can be changed according to the weight of the load on the hybrid vehicle 1. For example, when the load is relatively heavy, the threshold of the angle of the upgrade is changed to a smaller threshold. On the other hand, when the load is relatively light, the threshold of the angle of the upgrade is changed to a larger threshold.

Note that the quantity of the load on the hybrid vehicle 1 can be found by measuring the load of the carrier, for example, using an axle load sensor provided on the axle. Alternatively, the gross weight of the hybrid vehicle 1 can also be estimated by checking the behavior of the running hybrid vehicle 1 (for example, see JP 2004-025956 A). Further, the inclination of the road surface on which the hybrid vehicle 1 runs can be found, for example, using an inclination sensor or the like.

The invention claimed is:

1. A vehicle driven by an internal combustion engine and an electric motor that are connected to shafts configured to transfer power through a clutch configured to connect the power or disconnect the connection of the power, the vehicle comprising an apparatus including:
    an inclination sensor which finds an inclination of a road surface on which the vehicle runs and an electronic control device which controls operation of the electric motor and the clutch, in which:
    the electronic control device comprises:
    a determination unit for determining, while the clutch is disengaged, whether a condition, where an absolute value of a rotational speed of the electric motor is equal to or less than a predetermined first threshold and where torque of the electric motor is equal to or more than a predetermined second threshold, lasts for a predetermined third threshold or more;
    a torque control unit for controlling the electric motor to limit the torque of the electric motor; and
    a clutch control unit for controlling the clutch to be engaged when it is determined, while the clutch is disengaged, that the condition where the absolute value of the rotational speed of the electric motor is equal to or less than the first threshold and the torque of the electric motor is equal to or more than the second threshold lasts for the third threshold or more,
    wherein the torque control unit controls the electric motor to cancel the limitation of the torque of the electric motor after a predetermined period elapses after the torque of the electric motor is limited, wherein the predetermined period is extended when the inclination of the road surface exceeds an angle of upgrade threshold.

2. The vehicle according to claim 1, wherein the torque control unit controls the electric motor to cause the torque of the electric motor to be equal to or less than a predetermined fourth threshold within a predetermined period.

3. A control method for controlling a vehicle driven by an internal combustion engine and an electric motor that are connected to shafts configured to transfer power through a clutch configured to connect the power or disconnect the connection of the power, the method comprising the steps of:
    finding, by an inclination sensor, an inclination of a road surface on which the vehicle runs;
    determining, while the clutch is disengaged, whether a condition, where an absolute value of a rotational speed of the electric motor is equal to or less than a predetermined first threshold and where torque of the electric motor is equal to or more than a predetermined second threshold, lasts for a predetermined third threshold or more;
    controlling, by a control unit, the electric motor to limit the torque of the electric motor and controlling the clutch to be engaged when it is determined, while the clutch is disengaged, that the condition where the absolute value of the rotational speed of the electric motor is equal to or less than the first threshold and the torque of the electric motor is equal to or more than the second threshold lasts for the third threshold or more; and controlling the electric motor to cancel the limitation of the torque of the electric motor after a predetermined period elapses after the torque of the electric motor is limited, wherein the predetermined period is extended when the inclination of the road surface exceeds an angle of upgrade threshold.

4. A computer program stored on a non-transitory computer-readable storage medium for causing a computer to control a vehicle driven by an internal combustion engine and an electric motor that are connected to shafts configured to transfer power through a clutch configured to connect the power or disconnect the connection of the power to perform a process comprising the steps of:

finding, by a control unit, an inclination of a road surface on which the vehicle runs;

determining, while the clutch is disengaged, whether an condition, where an absolute value of a rotational speed of the electric motor is equal to or less than a predetermined first threshold and where torque of the electric motor is equal to or more than a predetermined second threshold, lasts for a predetermined third threshold or more;

controlling, by a control unit, the electric motor to limit the torque of the electric motor and controlling the clutch to be engaged when it is determined, while the clutch is disengaged, that the condition where the absolute value of the rotational speed of the electric motor is equal to or less than the first threshold and the torque of the electric motor is equal to or more than the second threshold lasts for the third threshold or more: and controlling the electric motor to cancel the limitation of the torque of the electric motor after a predetermined period elapses after the torque of the electric motor is limited, wherein the predetermined period is extended when the inclination of the road surface exceeds an angle of upgrade threshold.

* * * * *